United States Patent [19]

Zimmerman

[11] Patent Number: 5,031,875

[45] Date of Patent: Jul. 16, 1991

[54] DIAPHRAGM SEAL

[75] Inventor: James W. Zimmerman, Walnut, Calif.

[73] Assignee: The Toro Company, Minneapolis, Minn.

[21] Appl. No.: 537,914

[22] Filed: Jun. 13, 1990

[51] Int. Cl.⁵ .............................................. F16K 7/17
[52] U.S. Cl. .................................. 251/61.1; 92/98 R
[58] Field of Search ............... 251/30.01, 30.02, 30.03, 251/30.05, 38, 39, 40, 45, 46, 61, 61.1; 92/98 R

[56] References Cited

U.S. PATENT DOCUMENTS

| | | | |
|---|---|---|---|
| 2,283,439 | 5/1942 | Herman | 92/98 R |
| 2,300,722 | 11/1942 | Adams et al. | 92/98 R |
| 3,593,956 | 7/1971 | McCarty, Jr. | 251/45 |
| 4,175,590 | 11/1979 | Grandclement | 92/98 R |
| 4,505,450 | 3/1985 | Saarem et al. | 251/46 |
| 4,658,585 | 4/1987 | Kamenoto et al. | 92/98 R |
| 4,671,485 | 6/1987 | Saarem | 251/46 |
| 4,911,401 | 3/1990 | Holcomb et al. | 251/45 |

FOREIGN PATENT DOCUMENTS

| | | | |
|---|---|---|---|
| 508287 | 1/1952 | Belgium | 92/98 R |
| 1060205 | 6/1959 | Fed. Rep. of Germany | 251/61.1 |

Primary Examiner—George L. Walton
Attorney, Agent, or Firm—James W. Miller

[57] ABSTRACT

A fluid flow control valve has a diaphragm for sealing against a valve seat. The diaphragm includes two generally vertical annular lips extending upwardly and downwardly from a peripheral bead of the diaphragm. The bead is located at an interface between two mating portions of the valve with the lips received in annular channels located in the mating valve portions. The channels are configured relatively to the lips to bend the lips out of their normal, undistorted orientation to impose a biasing force on the lips tending to seal the lips in the channels.

13 Claims, 2 Drawing Sheets

DIAPHRAGM SEAL

TECHNICAL FIELD

The present invention relates to a fluid flow control valve having a resilient diaphragm which closes against a valve seat. More particularly, the present invention relates to an improved seal for preventing the diaphragm from leaking in the valve.

BACKGROUND OF THE INVENTION

Fluid flow control valves are known which use flexible, resilient diaphragms for sealing against a valve seat. The diaphragm flexes away from the valve seat to open the valve and allow fluid to flow between the valve inlet and outlet. Typically, an annular peripheral rim portion of the diaphragm is clamped between two mating portions of the valve to support the diaphragm in the valve. U.S. Pat. No. 4,505,450 to Saarem discloses such a valve in which the diaphragm rim is clamped between the valve body and a separable cap therefor.

In most valves of this type, including the Saarem valve, the diaphragm rim is tightly compressed to prevent leakage between the diaphragm and the mating valve portions. Saarem uses an open-ended nut which can be screwed down to force the cap against the valve body and thereby compress the diaphragm rim. Other known valves use a plurality of spaced, threaded bolts which extend through the mating valve portions. These bolts can be sufficiently tightened using a wrench to compress the diaphragm rim.

However, it is desirable, for manufacturing and service reasons, to have a valve in which the mating portions that clamp the diaphragm rim are simply screwed together by hand, without using a wrench or other tools. It is faster and easier to assemble or disassemble such a valve and it is not necessary to have any tools on hand. Unfortunately, various problems are presented in achieving an adequate seal with prior art diaphragm rims. For one thing, it is difficult to sufficiently compress the rim, using just hand tightening, to achieve an adequate compression seal. In addition, the relative rotary motion at the interface between the mating valve components can pinch or deform the diaphragm rim causing the diaphragm to leak.

SUMMARY OF THE INVENTION

Accordingly, it is an aspect of this invention to provide an improved valve having a resilient diaphragm which includes an annular portion located at the interface of two mating valve portions. A means is provided for securing the mating valve portions together at the interface. The annular diaphragm portion includes at least one annular lip extending outwardly therefrom for engaging against a wall in one of the mating portions of the valve to seal thereagainst. A means is provided for biasing the lip towards the wall when the mating portions of the valve are secured together to seal the lip against the wall.

BRIEF DESCRIPTION OF THE DRAWINGS

The present invention will be described in more detail hereafter, when taken in conjunction with the following drawings, in which like reference numerals refer to like elements throughout.

DETAILED DESCRIPTION

Figure 1:
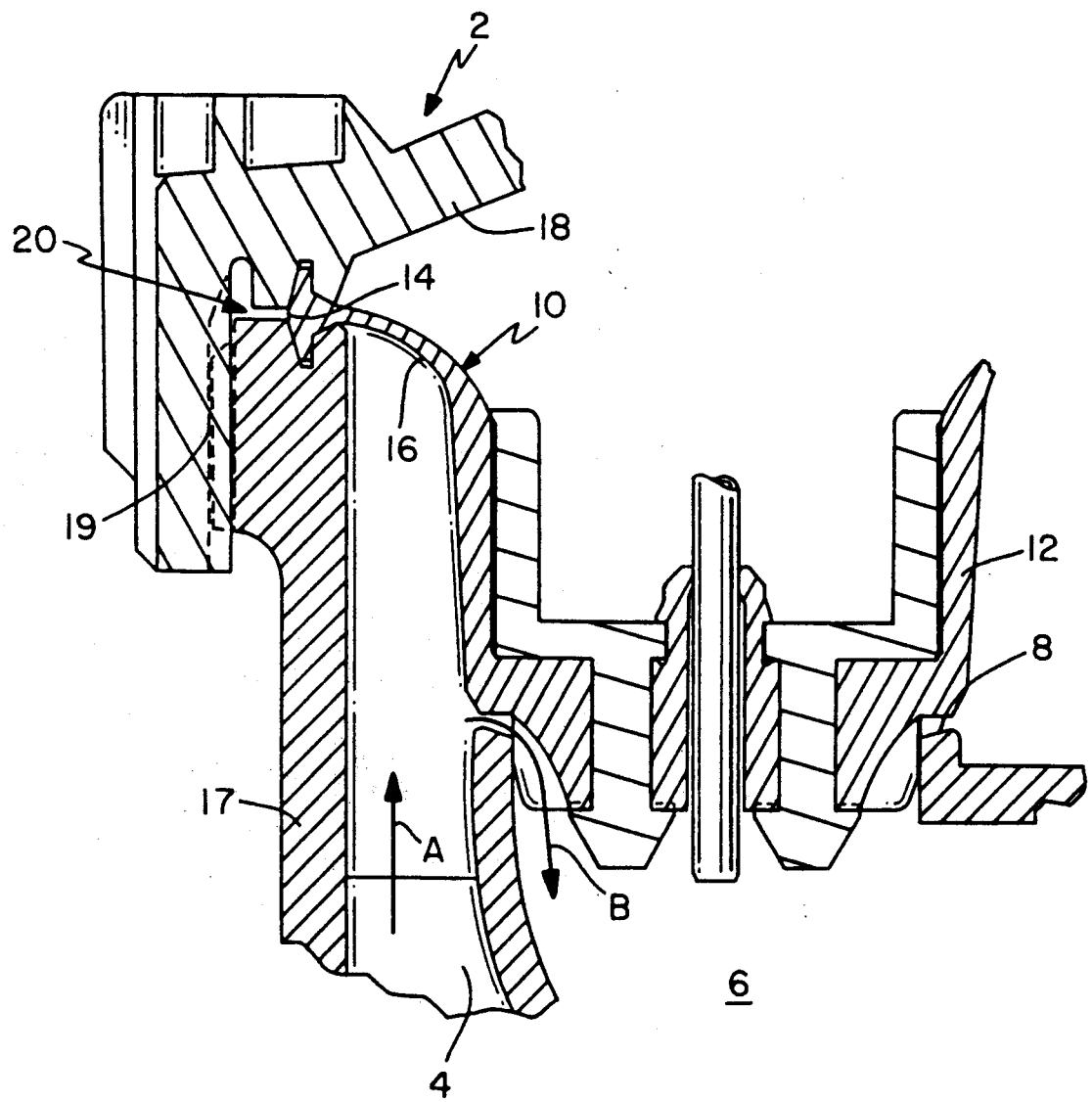
FIG. 1 is a cross-sectional view of a portion of a valve according to the present invention.

An improved fluid flow control valve according to this invention is generally illustrated as 2 in FIG. 1. Valve 2 includes a fluid inlet 4, a fluid outlet 6, and a generally horizontal valve seat 8 located between inlet 4 and outlet 6. A flexible, resilient diaphragm 10 made of any suitable material, e.g. an elastomeric material such as rubber, is supported in valve 2 for sealing against valve seat 8. Diaphragm 10 is shaped to have a cup-shaped central section 12, an annular rim or peripheral bead section 14 and an intermediate connecting section 16, all as taught in a copending patent application Ser. No. 07/537,916, filed June 13, 1990, owned by The Toro Company, the assignee of the present invention.

Figure 2:
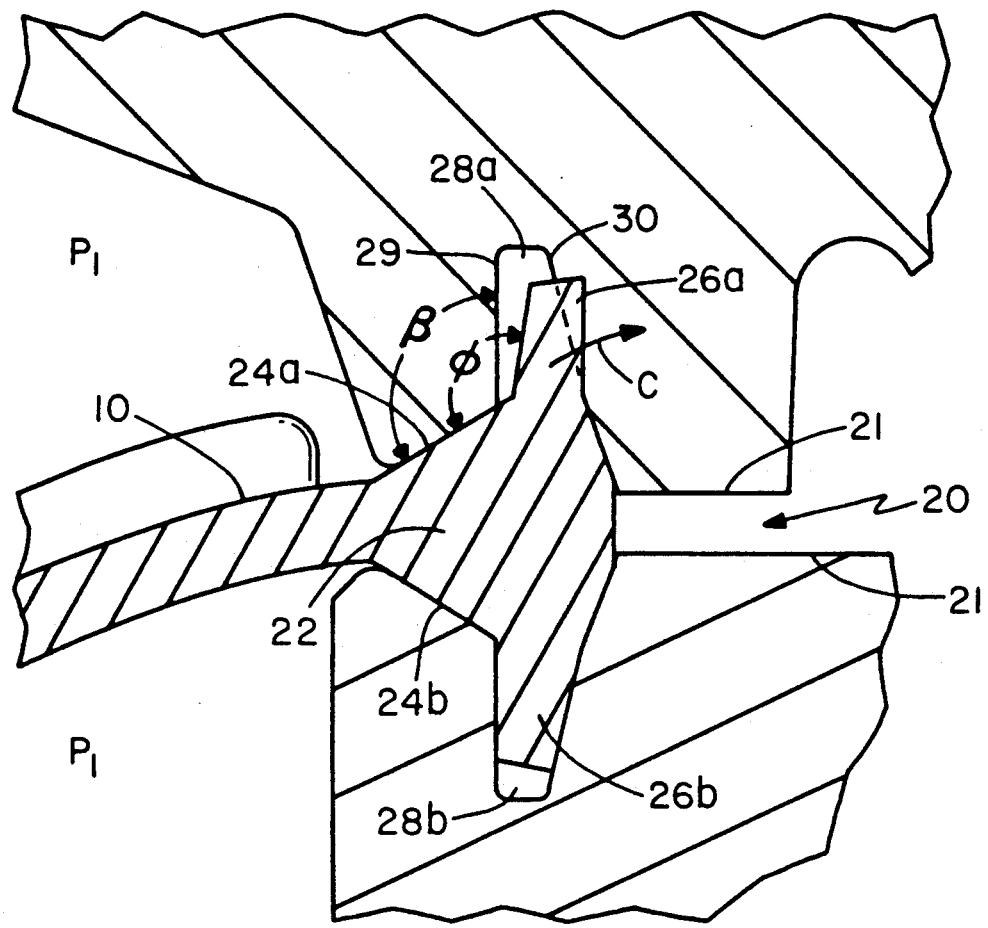
FIG. 2 is an enlarged cross-sectional view of the annular bead of the valve diaphragm for the valve shown in FIG. 1 and the upper and lower lips extending from that bead, particularly illustrating the upper lip in its normal, undeflected orientation prior to being received in the channel in the mating valve portion and the lower lip being shown in its biased, deflected orientation after being received in the channel in the mating valve portion, the upper and lower lips, however, being identically shaped so that both simultaneously have either the undeflected orientation of the upper lip or the deflected orientation of the lower lip depending on whether the lips are or are not received in the channels in the mating valve portions, both orientations being shown in FIG. 2 only for the purpose of directly contrasting the deflected and undeflected lip orientations and for drawing economy.

Valve 2 is a "pressure balanced" valve in which the fluid pressure at inlet 4, identified herein as $P_1$ in FIG. 2, is normally located on both sides of diaphragm 10. Diaphragm 10 closes against valve seat 8 due in part to a natural spring force provided in diaphragm 10 due to its shape. Valve 2 is opened by bleeding the pressure $P_1$ from the chamber above diaphragm 10. This causes diaphragm 10 to flex upwardly to disengage valve seat 8, thereby allowing fluid under pressure at inlet 4 to flow to outlet 6 as shown by the arrows A and B in FIG. 1. A pressure balanced valve 2 of this general type is shown in U.S. Pat. No. 4,911,401 to Holcomb et al, assigned to The Toro Company, assignee of the present application. This patent is hereby incorporated by reference for teaching various details of valve 2 unrelated to the present invention.

Valve 2 includes two mating potions comprising a valve body 17 having an open upper end closed by a cap 18. Cap 18 is separably attached to valve body 17 by screw threads 19 to allow cap 18 to be directly screwed onto and off of valve body 17. When cap 18 is screwed downwardly onto valve body 17, an interface 20 is provided between the two defined by a small gap between adjacent annular surfaces 21 on valve body 17 and cap 18.

The present invention relates to an improved seal between diaphragm rim 14 and valve 2 for preventing leakage therebetween. Referring now to FIG. 2, diaphragm rim 14 is formed as a thickened bead 22 having outwardly tapering upper per and lower faces 24a and 24b, respectively. Two generally vertical lips 26 are formed on the upper and lower faces 24a and 24b of bead 22, respectively. There is a first annular upper lip 26a extending upwardly from upper face 24a and a second annular lower lip 26b extending downwardly from lower face 24b.

Lips 26 are relatively thin and flexible. Lips 26 are integrally formed as part of bead 22 and are molded out of the same elastomeric material as diaphragm 10. As shown by upper lip 26a in FIG. 2, lips 26 have a normal, undeflected orientation in which lips 26 are maintained at an angle $\phi$ relative to the corresponding face 24 of bead 22. However, lips 26 are sufficiently flexible so that they can be distorted or bent out of this normal, undeflected orientation.

Each of the mating portions of valve 2 is provided with an annular channel 28 in the mating surfaces 19 and 20 which form interface 20. Each channel 28 has opposed facing inner and outer walls 29 and 30, respectively. Channel 28a in cap 18 faces downwardly to receive upper lip 26a on bead 22. Similarly, channel 28b in valve body 17 faces upwardly to receive lower lip 26b on bead 22. Each channel 28 is located at an angle $\beta$ relative to face 24 of bead 22. The angle $\beta$ of channel 28 is different from the angle $\phi$ of lips 26 in their normal, undeflected orientation thereof.

When diaphragm 10 is not contained in valve 2, lips 26 are normally located in their undeflected orientation extending vertically at the angle $\phi$. To assemble valve 2, lower lip 26b on diaphragm 10 is first dropped down into the lower channel 28b in valve body 17. Then, cap 18 is threaded down onto valve body 17 with upper lip 26a being received in upper channel 28a. The annular surfaces 21 at the interface 20 are tapered adjacent channels 28 to abut against the tapered faces 24a and 24b of bead 22. This helps center diaphragm 10 and guide the lips 26a and 26b of diaphragm 10 into their respective channels 28 as cap 18 is being tightened.

When cap 18 is fully tightened down onto valve body 17, lips 26 of diaphragm 10 will be deflected out of their normal undistorted orientation to a deflected orientation in which lips 26 conform to the angle $\beta$ formed by channels 28. Since angle $\beta$ is different from angle $\phi$, and since lips 26 are resilient tending to remain in their normal and undeflected orientation, a small amount of preload or biasing is developed in lips 26. This preload is in the direction of the arrows C in FIG. 2 tending to force lips 26 into engagement with the outer wall 30 of each channel 28.

The amount of preload placed on lips 26 can be adjusted by varying the angular difference between the angles $\phi$ and $\beta$ to ensure diaphragm lips 26 seal in channels 28 despite any small irregularities between the diaphragm and valve body 17 or cap 18 arising from the manufacturing process. This sealing is enhanced in valve 2 since each lip sees a pressure differential arising from the difference between pressure $P_1$ on each side of diaphragm 10 and atmospheric pressure which is present at interface 20. This pressure differential tends to further keep lips 26 biased outwardly into engagement with channel walls 30. However, since the pressure $P_1$ is reduced in the pressure chamber above diaphragm 10 when valve 2 is opened, and the pressure differential on upper lip 26a is correspondingly reduced, it is important that the biasing force on lips 26 arising from the difference between angles $\phi$ and $\beta$ be large enough to ensure a drip tight seal over the operating pressure range of valve 2.

Valve 2 according to this invention has numerous advantages. The use of angles lips 26 received in differently angles channels 28 to develop a preload on the lips ensures a drip tight seal even when cap 18 is only hand tightened on valve body 17. In fact, when valve 2 is closed with diaphragm 14 received against valve seat 8, it has been found that cap 18 can even be one eighth to one quarter of a turn loose and still maintain a drip tight seal with diaphragm 10 at interface 20. Thus, diaphragm 10 can be adequately sealed in valve 2, during assembly or servicing, simply by putting diaphragm 10 in place and screwing cap 18 downwardly onto valve body 17. No special tools are required and the use of wrench tightened bolts and nuts to develop a compression seal is no longer required.

Various modifications of this invention will be apparent to those skilled in the art. Thus, the scope of this invention is to be limited only by the appended claims.

I claim:

1. An improved fluid flow control valve of the type having a resilient diaphragm which includes an annular portion located at the interface of two mating valve portions; wherein the valve further includes means provided for securing the mating valve portions together at the interface, wherein the improvement relates to the diaphragm and comprises:
   (a) at least one annular lip extending outwardly from the annular portion of the diaphragm for engaging against a wall in one of the mating portions of the valve to seal thereagainst, wherein the lip is resilient to flex towards and away from the wall and has a normal unflexed orientation in which no biasing force is imposed on the lip; and
   (b) means for biasing the lip towards the wall by flexing the lip from its normal unflexed orientation into a flexed orientation when the mating portions of the valve are secured together to seal the lip against the wall, and wherein the wall is angled sufficiently differently relatively to the lip in its unflexed orientation to engage and deflect the lip from its unflexed orientation to its flexed orientation to thereby create the biasing force in the lip to seal the lip against the wall.

2. An improved fluid flow control valve as recited in claim 1, wherein the lip extends generally vertically from the annular portion of the diaphragm.

3. An improved fluid flow control valve as recited in claim 2, wherein the annular portion of the diaphragm comprises a peripheral bead.

4. An improved fluid flow control valve as recited in claim 2, wherein the lip is integrally formed with the annular portion of the diaphragm out of an elastomeric material.

5. An improved fluid flow control valve as recited in claim 4, wherein the lip is received in an annular channel with one wall of the channel comprising the wall against which the lip is biased.

6. An improved fluid flow control valve of the type having a flexible diaphragm for sealing against a valve seat, wherein the diaphragm includes an annular portion located at the interface between two mating portions of the valve for supporting the diaphragm in the valve, wherein the improvement relates to means for sealing the diaphragm in the valve which comprises:
   (a) upper and lower annular lips extending upwardly and downwardly, respectively, from the annular portion of the diaphragm, wherein the lips are resilient to flex about a pivot point therein, and wherein the lips have a normal undeflected orientation in which the lips are maintained at a first angle; and
   (b) annular channels contained in the mating portions of the valve body at the interface therebetween, wherein the channels form complementary shaped recesses for receiving therein the upper and lower lips, the channels being located at a second angle different from the first angle so that each lip when received in the recess formed by one of the channels will be flexed about the pivot point therein from its undeflected orientation into a distorted orientation conforming to the second angle of the channel to bias the lip into a sealing engagement in the recess formed by the channel.

7. An improved fluid flow control valve as recited in claim 6, wherein the mating portions of the valve have thread means for allowing one mating portion to be screwed onto the other mating portion to tighten the mating portions together.

8. An improved fluid flow control valve as recited in claim 7, wherein the mating portions of the valve include a valve body and a cap secured thereto, wherein the cap may be screwed onto and off of the valve body.

9. An improved fluid flow control valve as recited in claim 8, wherein the valve body contains the valve seat, a fluid inlet and a fluid outlet.

10. An improved fluid flow control valve as recited in claim 6, wherein the lips are integrally formed with the annular portion of the diaphragm.

11. An improved fluid flow control valve as recited in claim 10, wherein the annular portion of the diaphragm comprises a thickened peripheral bead having outwardly tapered upper and lower faces adjacent the upper and lower lips, respectively.

12. An improved fluid flow control valve as recited in claim 11, wherein the mating portions of the valve have tapered mating surfaces arranged to abut against the tapered upper and lower faces of the bead to help guide the lips into the channels.

13. An improved fluid flow control valve of the type having a resilient diaphragm for sealing against a valve seat, wherein the improvement relates to means for sealing the diaphragm in the valve which comprises:
 (a) two generally vertical annular lips extending from a peripheral bead on the diaphragm, the bead being located at an interface between two mating portions of the valve, wherein the lips are flexible about their point of attachment to the bead and have an unflexed orientation in which the lips extend at a first angle relative to the bead; and
 (b) two annular channels located in the mating valve portions with one channel being located on each of the mating valve portions, wherein the channels have opposite side walls that form complementary shaped recesses for receiving the lips on the diaphragm bead with one lip being received in each channel, wherein one side wall of each channel is located at a second angle relative to the bead which is sufficiently different from the first angle such that the one side wall of each channel engages the lip received in that channel and bends the lip out of its unflexed orientation and into a flexed orientation to thereby impose a biasing force on the lip tending to seal the lip against the one side wall of the channel.

* * * * *